(12) United States Patent
Durschmied

(10) Patent No.: US 7,047,833 B2
(45) Date of Patent: May 23, 2006

(54) FEED UNIT

(75) Inventor: Frank Durschmied, Nuremberg (DE)

(73) Assignee: Ina-Schaeffler KG (DE)

( * ) Notice: Subject to any disclaimer, the term of this patent is extended or adjusted under 35 U.S.C. 154(b) by 211 days.

(21) Appl. No.: 10/380,019

(22) PCT Filed: Jul. 27, 2001

(86) PCT No.: PCT/EP01/08689

§ 371 (c)(1),
(2), (4) Date: Mar. 24, 2003

(87) PCT Pub. No.: WO02/21019

PCT Pub. Date: Mar. 14, 2002

(65) Prior Publication Data

US 2003/0167866 A1    Sep. 11, 2003

(30) Foreign Application Priority Data

Sep. 9, 2000  (DE) .............................. 100 44 733

(51) Int. Cl.
*F16H 27/02* (2006.01)

(52) U.S. Cl. .................................... 74/89.32; 74/89.34

(58) Field of Classification Search .................. 74/841, 74/842, 48, 89.31, 89.32, 89.34, 89.33, 89.42, 74/473.12, 485, 565 L, 571 L, 580, 586

See application file for complete search history.

(56) References Cited

U.S. PATENT DOCUMENTS

| | | | | |
|---|---|---|---|---|
| 2,307,317 A | * | 1/1943 | Konig | 74/89.34 |
| 2,791,128 A | * | 5/1957 | Geyer | 74/89.34 |
| 3,336,925 A | * | 8/1967 | Thompson | 74/89.34 |
| 3,691,858 A | * | 9/1972 | Wilke | 74/89.34 |
| 4,463,291 A | | 7/1984 | Usry | |
| 4,715,241 A | * | 12/1987 | Lipinski et al. | 74/89.31 |
| 4,926,080 A | * | 5/1990 | Koyama | 310/80 |
| 5,099,161 A | * | 3/1992 | Wolfbauer, III | 310/80 |
| 5,639,065 A | | 6/1997 | Lin | |
| 5,895,084 A | * | 4/1999 | Mauro | 294/100 |
| 6,041,886 A | * | 3/2000 | Nakaishi et al. | 180/444 |
| 6,178,837 B1 | * | 1/2001 | Nagai et al. | 74/89.23 |
| 6,362,547 B1 | * | 3/2002 | Peterson et al. | 310/80 |
| 6,662,672 B1 | * | 12/2003 | Someya | 74/89.23 |

FOREIGN PATENT DOCUMENTS

| | | |
|---|---|---|
| JP | 11299169 | 10/1999 |
| JP | 200220715 | 8/2000 |

* cited by examiner

*Primary Examiner*—David Fenstermacher
(74) *Attorney, Agent, or Firm*—Charles A. Muserlian

(57) ABSTRACT

In a feed unit of a rod-type actuating element that is arranged in a housing (2) and guided for axial displacement relative to the housing (2), the feed unit further being a drive motor (4) that effects the displacement of the actuating element through a driving device that is rotatably retained in bearings in the housing (2), said driving device being a threaded spindle (1) and a spindle nut (3) surrounding the threaded spindle, wherein the drive motor (4) with its stator (5) and rotor (6) is arranged in the housing (2), and the spindle nut (3) is coaxially arranged in and fixed to a hollow shaft (7) that is surrounded by and fixed to the rotor (6).

3 Claims, 2 Drawing Sheets

FEED UNIT

This application is a 371 of PCT/EP01/08689 filed Jul. 27, 2001.

FIELD OF THE INVENTION

The invention concerns a feed unit comprising a rod-type actuating element that is arranged in a housing and guided for axial displacement relative to the housing, the feed unit further comprising a drive motor that effects the displacement of the actuating element through a driving device that is rotatably retained in bearings in the housing, said driving device comprising a threaded spindle and a spindle nut surrounding the threaded spindle.

BACKGROUND OF THE INVENTION

Feed units can serve to effect a rigid, variable-length connection between two points of articulation. They can be used in different technical fields, for instance, on machine tools also designated as "parallel kinematics machines" (PKM). The integrated drive and a measuring system enable a controlled variation of the length of a feed unit. The function of the feed unit is comparable to that of an extendible strut. A parallel kinematics machine can be equipped with three or six such units.

A feed unit known from the published document DE 36 42 938 C2 serves as a power actuating device with a lifting mechanism for a tipping apparatus of a driver's cabin of a truck. A rotary drive transmission mechanism with a motor that is disposed outside the housing of the actuating element is associated to the lifting mechanism. This device therefore has a complicated structure and is not lash-free and has a low axial rigidity and a large design space requirement, so that it is not suitable for use on a machine tool.

The published document JP 11-299 169 A shows a feed unit of the initially cited type. Concrete specifications as to the possibility of an articulated retention of this unit on a connecting structure are not disclosed in this document.

SUMMARY OF THE INVENTION

The object of the invention is to provide a feed unit of simple structure that forms a compact and ready-to-install component with which, in an articulated arrangement on a machine frame, the occurrence of an error of balance due to rotation is avoided.

The invention achieves the above object by the fact that the fixed bearing is configured as an angular contact thrust ball bearing and is axially supported in the region of an articulated axle for the housing extending through the center of gravity of the feed unit. For the axial support of the fixed bearing, the housing can comprise a flanged body, and the hollow shaft an integrally formed flange. The movable bearing can be configured as a needle roller bearing.

In the feed unit of the invention, a rotary drive transmission mechanism with its complicated structure can be dispensed with. Design space in addition to the housing design space is not required for the drive motor. The threaded spindle is slidably extendible out of the housing and therefore acts directly as an actuating element. The mounting of the drive motor and that of the threaded spindle form a single unit and enable an optimum flow of forces. The mounting has a thermally neutral structure so that the distance between one point of articulation and another point of articulation of the feed unit is not influenced by the motor heat. The structure of the unit can be chosen so that its center of gravity is situated on an articulated axle of the unit so as to minimize torques about the articulated axle.

BRIEF DESCRIPTION OF THE DRAWINGS

One example of embodiment of the invention is illustrated in the drawings and will be described more closely in the following.

DETAILED DESCRIPTION OF THE DRAWINGS

Figure 1:
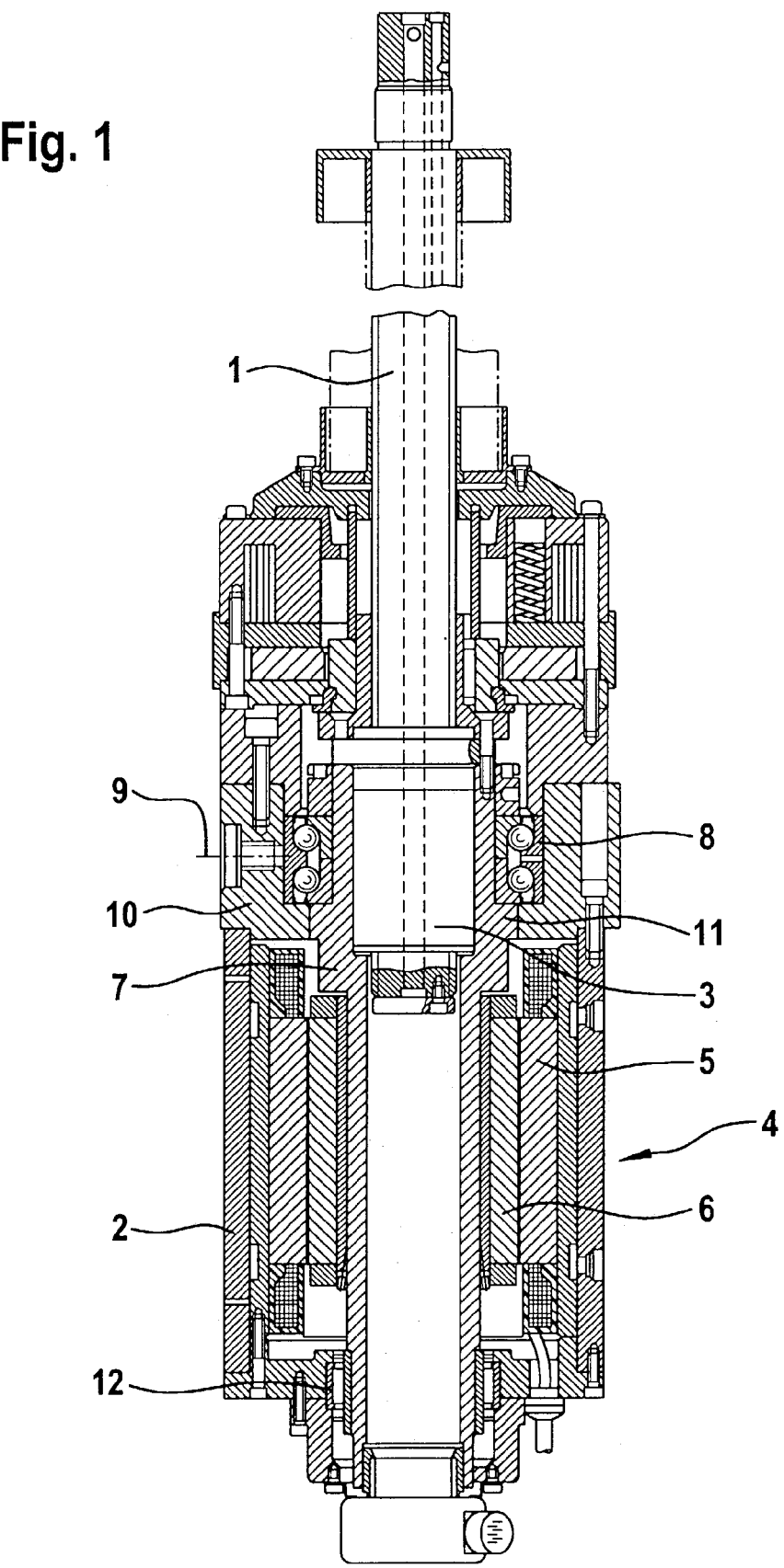
FIG. 1 shows a feed unit of the invention in a longitudinal section.

A feed unit of the invention that can also be designated as a module is illustrated in FIG. 1. This feed unit comprises a threaded spindle 1 that is situated partially in a housing 2 and can be slidably extended therefrom. Within the housing 2, the threaded spindle 1 is surrounded by a spindle nut 3 that is driven by a drive motor 4 comprising a stator 5 that is fixed on a housing wall and a rotor 6 that is arranged within the stator 5. The rotor 6 concentrically surrounds a hollow shaft 7 and is fixed thereto.

Together with the hollow shaft 7 and the rotor 6, the spindle nut 3 is rotatably mounted in a fixed bearing 8 that is configured as an angular contact thrust ball bearing. This bearing is situated in a central position relative to the spindle nut 3 and is arranged symmetrically to an articulated axle 9 of the feed unit, which articulated axle extends at right angles to the longitudinal axis of the threaded spindle 1. The bearing is fixed in a flanged body 10 of the housing 2. The inner ring of the fixed bearing 8 additionally bears in axial direction against a flange 11 of the hollow shaft 7. The flanged body 10 possesses bores for receiving axle journals of a shoulder joint.

Thrust forces that are introduced into the housing 1 through the threaded spindle 2 are transmitted by the spindle nut 3 into the hollow shaft 7 and further into the fixed bearing 8 and the articulated axle 9. In this way, an optimal flow of forces accompanied by a maximum of rigidity is guaranteed. The spindle nut 3 and the fixed bearing 8 are pre-stressed units. In addition, a movable bearing 12 for the drive motor 4 and the hollow shaft 7 projecting therefrom is also arranged in the housing 2. This movable bearing 12 is configured as a needle roller bearing and is arranged in an end of the housing 2. As a result, the precision of positioning of the module is not influenced by a thermal expansion of the hollow shaft caused by the heat produced by the motor.

To avoid an error of balance during rotation about the articulated axle 9, the fixed bearing 8 and the articulated axle 9 of this arrangement are positioned at the center of gravity of the feed unit also designated as a module. Due to the arrangement of the bearing directly on the spindle nut 3 in the region of the articulated axle 9 and the high rigidity thus obtained, the basic conditions for a high natural frequency of the system and a low level of operating noise are also established.

Due to multiple mounting, i. e. the use of the fixed bearing 8 also for the mounting of the motor, a high density of performance is achieved with a small design space. The fixed bearing 8 and the movable bearing 12 serve at the same time for mounting the rotor 6 of the drive motor 4 and the spindle nut 3 that guides the threaded spindle 1. As a complete unit including a motor, a brake, a measuring system and a mounting, the module is ready to be installed on parallel kinematics machines.

Figure 2:
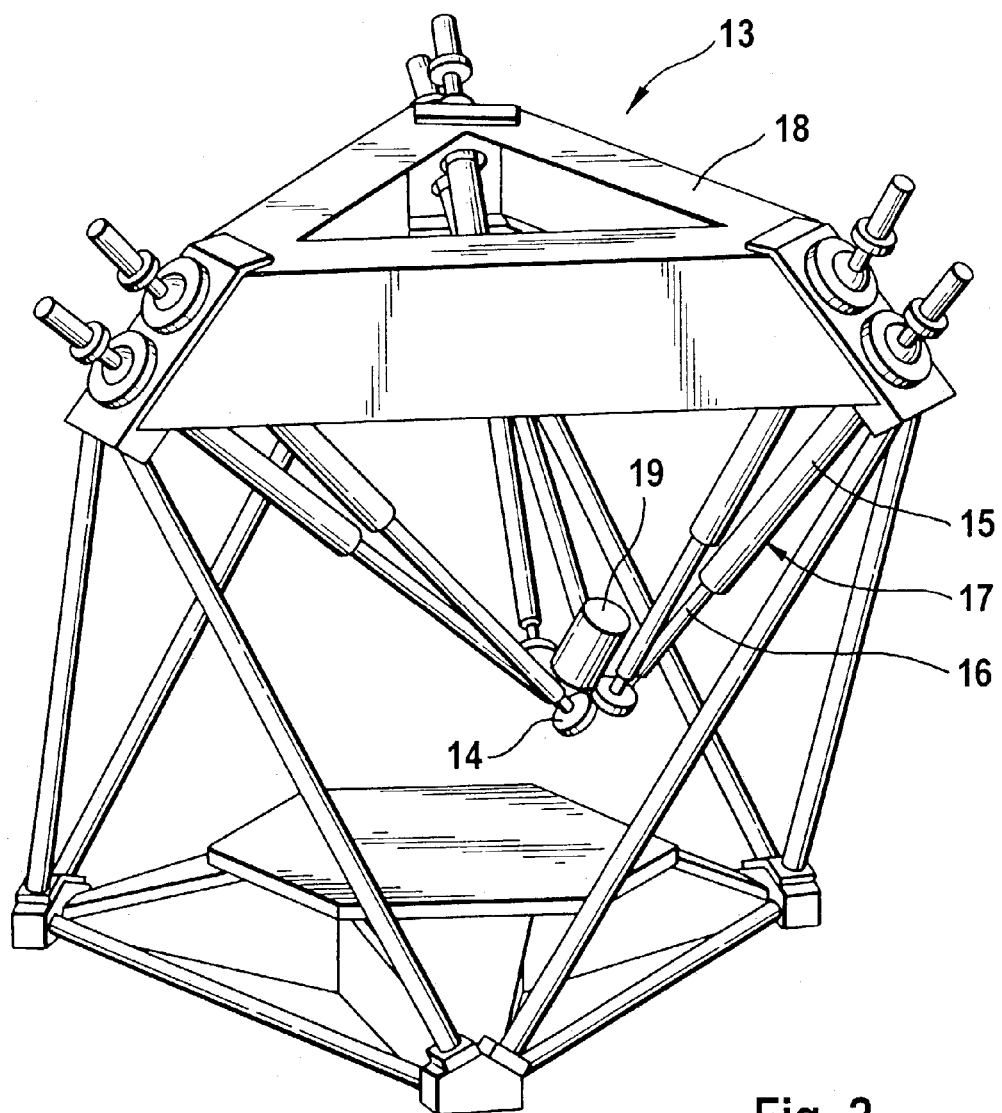
FIG. 2 is a schematic representation of a machine tool on which feed units of the invention can be installed.

In the machine tool 13 shown in FIG. 2, that is configured as a parallel kinematics machine, a tool holder 14 can be moved into any desired position in space. The machine is provided with a plurality of feed units that comprise extendible arms 17 formed by inter-inserted tubes 15 and 16. One end of the arms 17 is articulated on a frame 18 and the other end on the tool holder 14. The tool holder 14 is provided with a tool, not shown; that is driven by a motor 19. By retracting or extending one or more arms 17, the tool holder 14 can be moved into any desired position in space. The feed units of the invention can be used in this machine as extendible arms.

REFERENCE NUMERALS

1 Threaded spindle
2 Housing
3 Spindle nut
4 Drive motor
5 Stator
6 Rotor
7 Hollow shaft
8 Fixed bearing
9 Articulated axle
10 Flanged body
11 Flange
12 Movable bearing
13 Machine tool
14 Tool holder
15 Tube
16 Tube
17 Extendible arm
18 Frame
19 Motor

The invention claimed is:

1. A feed unit comprising a rod-type actuating element that is arranged in a housing (2) and guided for axial displacement relative to the housing (2), the feed unit further comprising a drive motor (4) that effects the displacement of the actuating element through a driving device that is rotatably retained in bearings in the housing (2), said driving device comprising a threaded spindle (1)) and a spindle nut (3) surrounding the threaded spindle, the drive motor (4) with its stator (5) and rotor (6) being arranged in the housing (2), and the spindle nut (3) being coaxially arranged in and fixed to a hollow shaft (7) that is surrounded by and fixed to the rotor (6), the hollow shaft (7) being rotatably mounted in a fixed bearing (8) in the region of the spindle nut (3) and in a movable bearing (12) in an end region of the housing (2), characterized in that the fixed bearing (8) is configured as an angular contact thrust ball bearing and is axially supported in the region of an articulated axle (9) for the housing (2) that extends through the center of gravity of the feed unit.

2. A feed unit according to claim 1, characterized in that, for the axial support of the fixed bearing (8), the housing (2) comprises a flanged body (10) and the hollow shaft (7) comprises an integrally formed flange (11).

3. A feed unit according to claim 1, characterized in that the movable bearing (12) is configured as a needle roller bearing.

* * * * *